United States Patent [19]
Ostlie

[11] Patent Number: 5,876,805
[45] Date of Patent: Mar. 2, 1999

[54] VISIBLE LIGHT POLYMERIZABLE THIOL-ENE COMPOSITION

[75] Inventor: Brian W. Ostlie, Woodbury, Minn.

[73] Assignee: Minnesota Mining & Manufacturing Co., St. Paul, Minn.

[21] Appl. No.: 951,867

[22] Filed: Oct. 16, 1997

Related U.S. Application Data

[63] Continuation of Ser. No. 628,420, Apr. 5, 1996, abandoned.
[51] Int. Cl.$^6$ .............................. C08G 75/26; C08G 75/04
[52] U.S. Cl. ......................... 427/519; 427/517; 427/514; 522/18; 522/81; 522/83; 522/180
[58] Field of Search ............................. 522/18, 180, 181, 522/182, 83, 40, 64, 167; 427/519, 517, 514

[56] References Cited

U.S. PATENT DOCUMENTS

| | | | |
|---|---|---|---|
| 4,017,652 | 4/1977 | Gruber | 427/54 |
| 4,139,385 | 2/1979 | Crivello | 96/35.1 |
| 4,234,676 | 11/1980 | Hein et al. | 430/286 |
| 4,710,523 | 12/1987 | Lechtken et al. | 522/38 |
| 4,808,638 | 2/1989 | Steinkraus et al. | 522/24 |
| 4,936,511 | 6/1990 | Johnson et al. | 239/346 |
| 4,971,251 | 11/1990 | Dobrick et al. | 239/346 |
| 5,100,929 | 3/1992 | Jochum et al. | 522/180 |
| 5,166,301 | 11/1992 | Jacobs | 528/67 |
| 5,218,009 | 6/1993 | Rutsch et al. | 522/16 |
| 5,387,445 | 2/1995 | Horiuchi et al. | 428/1 |
| 5,399,770 | 3/1995 | Leppard et al. | 568/15 |
| 5,459,173 | 10/1995 | Glaser et al. | 522/180 |
| 5,472,992 | 12/1995 | Leppard et al. | 522/18 |
| 5,516,455 | 5/1996 | Jacobine et al. | 522/180 |

FOREIGN PATENT DOCUMENTS

| | | | |
|---|---|---|---|
| 0 366 977 | 10/1989 | European Pat. Off. | A61K 6/083 |
| 0 503 834 A2 | 3/1992 | European Pat. Off. | |
| 296 288 A5 | 10/1983 | Germany | C08J 3/24 |
| 01022927 | 1/1989 | Japan | C08G 75/04 |
| WO 93/02600 | 2/1993 | WIPO | A47G 21/18 |

OTHER PUBLICATIONS

*Applied Chemistry in an Invisible Car Refinish,* by F.R.J. Willemse in Progress in Organic Coatings, 17 (1989) pp. 41–51.

*Chemistry & Technology of UV & EB Formulation for Coatings, Inks & Paints,* vol. III, Photoiniators for Free Radical and Cationic Polymerisation, by K. Dietliker, 1991, pp. 168–181 and 285.

*Novel Photoinitiator System for UV Curing of Thick Pigmented Coatings,* Ljubomir Misev and Horst Scheidt, Marketing Center Additives for Radiation Curing, Ciba–Geigy Limited, CH–4002 Basle, Switzerland (undated).

*Liquid Photoinitiator for Ultraviolet Curing of Coatings and Inks, Preliminary Product Data,* CGI 1700, Ciba–Geigy Corp., 1994.

Primary Examiner—Susan W. Berman
Attorney, Agent, or Firm—Janice L. Dowdall

[57] ABSTRACT

Visible light cured polymerizable thiol-ene compositions comprising at least one monomer or oligomer having a plurality of free-radically polymerizable ethylenically unsaturated groups, at least one compound having a plurality of thiol groups, at least one acyl phosphine oxide photoinitiator and optional adjuvants, such as stabilizers, pigments, fillers, and polymerization inhibitors are disclosed. The polymerized compositions are useful, as protective coatings, or anti-chip coatings or as repair putties on exterior coated substrates such as plastics, wood and metal, especially for the automotive and marine industries.

17 Claims, No Drawings

VISIBLE LIGHT POLYMERIZABLE THIOL-ENE COMPOSITION

This is a continuation of application Ser. No. 08/628,420, filed Apr. 5, 1996, now abandoned.

FIELD OF THE INVENTION

This invention relates to thiol-ene compositions that are photopolymerizable with visible light to provide protective coatings, readily sanded putties, sealants, and adhesives which are suitable for bonding to metals, plastics, woods, paint primers, and paint or lacquered substrates and are particularly useful for the automotive and marine industry.

BACKGROUND OF THE INVENTION

In labor intensive, cost sensitive businesses such as the automobile aftermarket time savings such as rapid cure or cure on demand coatings are premium benefits. In addition, there is an intense effort by researchers and the industry to provide high and 100% solids formulations to reduce the use of solvents for user health and environmental reasons.

Current body putties (sometimes included in the term "body fillers") are based on unsaturated polyester resins which are cured by a free radical curing mechanism initiated by organic peroxides. Drying times to allow sanding take 20–30 minutes. This delays the repair process and is especially inefficient if needed repairs are noticed in the paint booth where delays seriously impact shop productivity.

Radiation curable compositions containing carbon—carbon (C—C) unsaturated monomers and polythiols were developed in the early 1970s. U.S. Pat. No. 4,234,676 describes a composition comprising a C—C unsaturated polymer, a cross linkable monomer, a polythiol, and curing agent directed primarily at printing plate production.

U.S. Pat. No. 4,808,638 (Steinkraus, et al) describes a composition comprising a norbornene resin, polythiol, and free radical initiator which can be photocured in visible light when a iron arene complex is present.

U.S. Pat. No. 4,139,385 (Crivello) describes a composition comprising a polyolefin, polythiol, and onium salt photoinitiator. The films, 75 micrometers, (3 mil) thick were curable by a cationic mechanism with UV light as an initiator.

SUMMARY OF THE INVENTION

The present invention addresses the needs of the industry, especially the automotive industry and marine industry, by providing a rapid cure, near 100% solids (solvent free), composition, using visible light.

The present invention includes a visible light polymerizable composition comprising:
(a) at least one monomer or oligomer having a plurality of free-radically polymerizable ethylenically unsaturated groups;
(b) at least one compound having a plurality of thiol groups (polythiol), and
(c) an acyl phosphine oxide photoinitiator.

The inventive composition can be made free of volatile organic compounds (VOC) and can be applied and cured very rapidly under a visible light source. Tack free times for at least up to 1200 micrometers (47 mil) coating thickness are under 30 seconds when using a visible light source.

The above composition provides a visible light curing protective coating which may be used as an anti-chip coating for any coated substrate, such as metal, wood or plastic and is especially useful in the marine and automotive industry. For example, automotive anti-chip coatings are applied, e.g. by spraying, between primer and top coat to impart protection to the underlying substrate in chip vulnerable areas such as rocker panels.

The above composition also provides repair putties or body fillers. Putties and fillers are thixotropic (typically having a viscosity range of between about 1,000 to 2,000,000 centipoise; however some specialty fillers can have viscosities below 500 centipoise) and applied to repair small dents, pinholes, scratches and other minor damage to plastics, woods, and metals that may be painted or lacquered. Such putties are especially applicable in the marine and automotive industry.

Another aspect of the present invention relates to methods for coating substrates with protective coatings. The met hod includes the steps of:
(a) providing a substrate having a surface that can be coated;
(b) applying a visible light polymerizable composition to said surface wherein said composition comprises:
(i) at least one monomer or oligomer having a plurality of free-radically polymerizable ethylenically unsaturated groups,
(ii) at least one compound having a plurality of thiol groups, and
(iii) an acyl phosphine oxide photoinitiator
(c) irradiating said coated substrate with actinic radiation until said coating is cured.

A final aspect of the present invention relates to methods for repairing defects in substrates. Many of the plastic, wood, and metal surfaces found on and within boats, airplanes, motor vehicles (automobiles), buildings and household appliances eventually become damaged and need to be repaired. The damaged substrates have defects that include, but are not limited to, scratches, dents, cracks, holes, and the like. Such defects and imperfections are readily repaired using compositions of the present invention because they adhere to a variety of coated and uncoated substrate surfaces, while uncured they are easily applied, worked, and leveled, and they rapidly cure to a hardened state that is readily filed, sanded, or ground with excellent featherability. More specifically the repair method includes the following steps:
(a) providing a coated substrate having a defect;
(b) applying a light polymerizable composition to said adherent region, wherein said composition comprises:
(i) at least one monomer or oligomer having a plurality of free-radically polymerizable ethylenically unsaturated groups;
(ii) at least one compound having a plurality of thiol groups;
(iii) an acyl phosphine oxide photoinitiator; and
(iv) at least one filler; and
(c) irradiating said composition coated region with actinic radiation until said composition is cured.

DETAILED DESCRIPTION

As used in this application:

"actinic radiation" means photochemically active radiation and particle beams. Actinic radiation includes, but is not limited to, accelerated particles, for example, electron beams; and electromagnetic radiation; for example, microwaves, infrared radiation, visible light, ultraviolet light, X-rays, and gamma-rays. The radiation can be monochromatic or polychromatic, coherent or incoherent, and should be sufficiently intense to generate substantial numbers of free radicals from the photointiators used in the inventive compositions.

"(meth)acrylic groups" means both acrylic and methacrylic groups.

"ethylenically unsaturated groups" include, but are not limited to, vinyl, (meth)acrylic and the like.

"Cure" and "polymerize" are used interchangeably in this application to indicate a chemical reaction in which relatively simple molecules combine to form a chain or net-like macromolecule.

"100% solids" means a composition free of volatile organic compounds (VOC).

"Tack-free" means not tacky when touched with the human hand and therefore not sticky in general. Tack-free implies there is no transfer of material or residue from a substrate surface coated with compositions of the invention when touched (e.g., with a wooden applicator stick).

"Visible light" means light having a spectral output between about 400 and about 700 nanometers. Exemplary visible light sources include, but are not limited to, the sun, lasers, metal vapor (sodium and mercury) lamps, halogen lamps, fluorescent room light, and flashlights. An illustrative, but non-exhaustive, list of light sources is provided in the Example section.

The present invention provides a polymerizable thiol-ene composition comprising at least one monomer having one or more ethylenically unsaturated groups, at least one polythiol; and a free radical polymerization photoinitiator, or blend of photoinitiators, with absorption in the visible range sufficient to initiate photopolymerization.

Particularly useful examples of ethylenically unsaturated vinyl monomers or oligomers include: styrene, alkylstyrenes, halostyrenes, acrylonitrile, vinyl chloride, vinylidene chloride; vinyl ethers, such as 1,4-cyclohexanedimethanol divinyl ether (CHVE) and diethyleneglycol divinyl ether (DVE); vinyl esters, such as vinyl acetate; and N-vinyl derivatives, such as N-vinylpyrrolidone and N-vinyl formamide.

Useful examples of ethylenically unsaturated acrylic monomers or oligomers include: alkyl or hydroxyalkyl (meth)acrylates such as methyl(meth)acrylate, ethyl(meth)acrylate, butyl(meth)acrylate, (meth)acrylamide, 2-ethylhexylacrylate, 2-hydroxyethyl acrylate, isobornyl acrylate, glycerol diacrylate, glycerol triacrylate, tetraethylene glycol diacrylate, 1,4-butanediol diacrylate, ethylene glycol diacrylate, diethylene glycol diacrylate, triethylene glycol dimethacrylate, 1,6-hexanediol diacrylate, 1,3-propanediol diacrylate, 1,3-propanediol dimethacrylate, trimethylolpropane triacrylate, 1,2,4-butanetriol trimethylacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyl dimethylmethane, bis[1-(3-acryloxy-2-hydroxy)]-p-propoxyphenyldimethylmethane, tris (hydroxyethyl) isocyanurate trimethacrylate, epoxy acrylates, urethane acrylates, and ethoxylated acrylates. Particularly useful highly functional acrylates are, for example, trimethylolpropane triacrylate(TMPTA), trimethylolpropane ethoxy triacrylate TMPEOTA, and pentaerythritol triacrylate (PETA). Blends of acrylates can be made to adjust cure rate and final properties of the cured material.

Useful examples of compounds having a plurality of thiol groups (polythiols) include ethylene glycol bis(thioglycolate), ethylene glycol bis(β-mercaptopropionate), trimethylolpropane tris(thioglycolate), trimethylolpropane tris(mercaptopropionate), pentaerythritol tetrakis(thioglycolate) and pentaerythritol tetrakis(β-mercaptopropionate), all of which are commercially available. A specific example of a preferred polymeric polythiol is polypropylene ether glycol bis(β-mercaptopropionate) which is prepared from polypropylene-ether glycol (e.g. Pluracol P201, BASF Wyandotte Chemical Corp.) and β-mercaptopropionic acid by esterification. Poly-α-mercaptoacetate or poly-β-mercaptopropionate esters, particularly the trimethylolpropane triesters or pentaerythritol tetraesters are preferred. Other polythiols which may be suitably employed include alkyl thiol functional compounds such as 1,2-dimercaptoethane, 1,6-dimercaptohexane and the like. Thiol terminated polysulfide resins may also be employed. Particularly useful highly functional polythiols include pentaerythritol tetramercaptopropionate (PTM) and trimethylolpropane mercaptopropionate (TMP).

Useful visible light curing photoinitiators for the present invention include acyl phosphine oxides or acyl phosphine oxides blended with commercially available initiators which have been found capable of free radical initiation at a wavelength >400 nanometers.

Acyl phosphine oxides include bis acyl compounds and are of the formulae

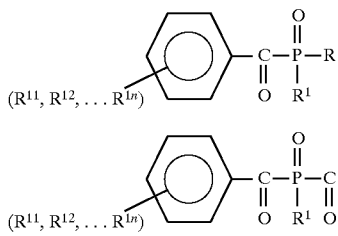

wherein
$R^{11}, R^{12}, \ldots R^{1n}$ are independently hydrogen or one or more substituents selected from the group consisting of alkyl of 1–4 carbon atoms, alkoxy of 1–4 carbon atoms and halogen (preferably chlorine), and n is an integer in the range of from 1 to 4 (i.e., there can be up to 4R substituents on the phenyl ring), preferably in the range of from 2 to 3 and the substituents are preferably attached at the 2,4, or 6-positions of the phenyl group.

R and $R^1$ are each independently alkyl of 1–20 carbon atoms; alkoxy of 1–6 carbon atoms; phenyl or phenyl substituted by $R^{11}, R^{12}, \ldots R^{1n}$; or R and $R^1$, when taken together with the phosphorous atom, form a 5–7 membered ring.

Preferred acyl phosphine oxides include those of formula I or II wherein n is in the range of from 2 to 3 and the substituents are attached at the 2,4, or 6-positions of the phenyl group.

Particularly valuable acyl phosphine oxides are bis(2,6-dimethoxybenzoyl-2,4,4-trimethylpentyl phosphine oxide, 2,4,6-(trimethylbenzoyl)diphenyl phosphine oxide and ethyl-2,4,6-trimethylbenzoyl phenyl phosphinate.

The acyl phosphine oxides may be used alone, but to provide a balance of surface and through cure, may be preferably blended with any commercially available initiator or sensitizer, for example as a preferred embodiment, an α-hydroxy-ketone. Such blends may contain from about 5–95 wt-% acyl phosphine oxide in the blend, preferably 15–85 wt-%, or most preferably about 25 to about 75 wt-%.

Useful α-hydroxyketones include those of the formula

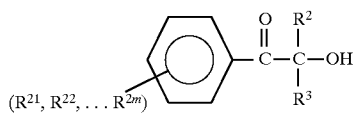

wherein $R^2$ and $R^3$ are each independently hydrogen, alkyl of 1–6 carbon atoms or phenyl, and $R^{21}, R^{22}, \ldots R^{2m}$ are independently selected from the group consisting of hydrogen, alkyl of 1–6 carbon atoms, alkoxy of 1–6 carbon atoms and halogen; and m is an integer in the range of from 1 to 3. A particularly useful (α-hydroxyketone is 2-hydroxy-2-methyl-1-phenylpropan-1-one (HMPP).

A particularly useful photoinitiator is Irgacure™ 1700 available from CIBA-Geigy Corporation, which is a 25:75 wt-% blend of bis(2,6-dimethoxybenzoyl)-2,4,4-trimethylpentyl phosphine oxide (DMBAPO) and 2-hydroxy-2-methyl-1-phenylpropan-1-one (HMPP). Additional photoinitiators having utility in the present invention are disclosed in U.S. Pat. Nos. 5,472,992 and 5,281,009 the disclosures of which are incorporated by reference herein.

It is also within the scope of this invention to add optional adjuvants such as thixotropic agents, pigments, e.g. titanium dioxide, fillers, e.g., fumed silica, stabilizers, polymerization inhibitors, such as, for example, hydroquinone, pyrogallol, butylated hydroxytoluene (BHT), or aluminum N-nitrosophenylhydroxylamine which is commercially available from Wako Pure Chemical Industries, Ltd. as Q-1301, wetting agents, reinforcing fibers, monomeric adhesion promoters, such as β-carboxyethyl acrylate, and other additives as known to those skilled in the art.

Glass microbubbles, having a particle size from about 1 to 1,000 micrometers, preferably about 5 to 200 micrometers as determined by a Coulter Counter Particle Size Analyzer, can be blended with the compositions of this invention, especially for putties, and can provide the advantage of low density and easy sanding. These benefits are provided when glass bubble concentrations are in the range of from about 2 wt % to about 20 wt %, preferably from about 5 wt % to about 15 wt %. Preferred glass bubbles, such as Scotchlite™ S22 glass bubbles, have a median particle size of 30 micrometers and a maximum particle size of up to about 125 micrometers. However, it has been found, though not understood, that certain glass bubbles, cannot be used with Q-1301 inhibitor due to inhibitor deactivating interactions. While it is desirable to keep the solvent level as low as possible, solvent can be used to dissolve the adjuvants particularly the polymerization inhibitors useful for extending the shelf life of the photopolymerizable composition or to reduce the viscosity of the composition for spray application.

The composition of the present invention may vary in amounts of components. The amounts of the two major components, the monomer or oligomer having a plurality of free-radically polymerizable ethylenically unsaturated groups and the polythiol, may vary according to their molar equivalence in a ratio of about 1:10 to 20:1 of ene to thiol, preferred from about 1:4 to 4:1, or more preferred from about 1:2 to 2:1.

Table I is illustrative of operable and preferred ranges for the components of the present composition in weight percent.

Polymerization inhibitors, as optional adjuvants, are important in providing storage stability to the compositions of the present invention. The amount of inhibitors employed in the compositions is small and may vary from about 100 to about 800 parts per million (ppm), preferably about 200 to about 400 ppm.

TABLE 1

| Component | wt-% Useful | wt-% Preferred | wt-% More Preferred |
|---|---|---|---|
| ethylenically unsaturated monomer or oligomer | 15–85 | 25–75 | 35–65 |
| polythiol | 10–90 | 20–80 | 30–70 |
| photoinitiator | 0.1–10.0 | 0.5–7.5 | 1.0–5.0 |
| optional adjuvants | 0–20.0 | 2.0–15.0 | 5.0–10.0 |

Unlike known curing compositions, a surprising feature of the present invention is that the compositions may contain extender pigments which can lower cost, impart hiding efficiency, improve properties, or provide desirable rheology. It has been shown with the inventive chemistry that a wide variety of filler combinations can be successfully formulated having a coating thickness of at least up to 900 micrometers (35 mils) and cured within 30 seconds by a visible light source. Preferred extender pigments are titanium dioxide and calcium carbonate. Dark pigments, such as carbon black, that absorb visible light are not preferred.

The present invention provides fast cure times for the coating compositions with several weeks of pot life. Common anti-chip coatings are either solvent based or water based single component systems that are generally less than 50% solids. Such coatings usually require numerous coats to achieve texture and film thickness. Flash times or dry times usually exceed 1 hour, which delays the application of the top coat paint system and decreases body shop efficiency.

The near 100% solids or VOC-free, light curing coating of the present invention requires just 1–2 coats to achieve texture and film build. Ambient fluorescent lighting, or paint booth lighting, will cure this coating tack-free in less than 10 minutes. Once the coating becomes tack-free, the topcoat paint can be applied resulting in significant time savings for the painter.

Chip-resistant coatings having a range of surface textures (smooth, medium, and coarse) can be prepared from the inventive compositions. The range of textures may be readily adjusted to match original equipment manufacturer (OEM) applied chip-resistant coatings. Texture matches can be achieved by adjusting the amount of thixotropic agent used in the inventive composition to provide a viscosity of from about 100 to about 200,000 centipoise, preferably from about 500 to about 30,000 centipoise as measured using a Brookfield RVT viscometer at about 25° C. The texture can also be varied by adjusting the spray coating process variables such as the distance from spray nozzle to panel, the nozzle orifice diameter, the air pressure supplied to the spray gun, and number of coats applied. A quantitative estimate of the texture can be obtained with the BYK-Gardner wave-scan meter (available from BYK-Gardner USA, Silver Spring, Md. 20910) using the long wavelength setting. Smooth textures have BYK wave-scan values of less than 65; medium textures values of from 65 to 85; and course textures values greater than 85.

As a putty, the composition of the present invention has similar operable and preferred ranges for the photoreactive components as shown in Table 1. However, the putty preferably has higher levels of filler to provide easy sanding, lower cost, and weight reduction. For example, about 0.5–7.0 weight % fumed silica can be added for rheology control, which provides the composition with a viscosity in the range of from about 1,000 to about 2,000,000 centipoise, more commonly from about 1,500 to about 750,000 centipoise, when measured using a Brookfield RVT viscometer at 25° C. Titanium dioxide and calcium carbonate may also be added. A preferred filler is glass bubbles. The loading is limited by the amount that will reduce the properties of the cured putty, e.g. impact resistance and adhesion. Easy sanding putties are provided with filler levels in the range of from about 2 wt % to about 20 wt % preferably from about 5 wt % to about 15 wt %.

The putty compositions of the present invention can be cured at thicknesses up to at least 900 micrometers (35 mil) in less than 30 seconds with inexpensive, relatively harmless visible light sources such as a spotlight or small flashlight. Thicker plugs or molded parts can be cured tack free in seconds. The free radical reaction continues without further application of light to cure through the bulk in several hours. Best adhesion to metal parts is observed if the coating is less than 500 micrometers (20 mil) thick and the substrate is abraded and cleaned.

The inventive composition should be packaged in a container which protects it from premature exposure to light. The low viscosity compositions of the present invention, e.g. coatings, (viscosity ranges between about 100 and 200,000 centipoise) can be packaged in a foil bag and application system (3MQL foil bag fitted with NCU nozzle), described in U.S. Pat. Nos. 4,936,511 and 4,971,251 which are incorporated herein by reference. The bag is made up of separate sealable portions. The components of the composition are mixed and placed in one part of the bag except for the thiol component. The thiol component is contained in a separate sealed portion of the bag, which is mixed with the other components by hand for about 30 seconds after breaking the separating seal. Once the components are mixed, a third seal at one end of the package is broken allowing a self-extending tube, e.g. as described in PCT Publication WO 93/02600, to enter the material. The self-extending tube is connected to a nozzle which sprays the composition to the desired substrate. A pot life of several weeks is obtained in the bag after mixing to ensure that the composition can be used without excessive waste.

The higher viscosity compositions of the present invention, e.g., putties, (viscosity ranges between 1,000 and 2,000,000 centipoise) can be packaged in a two-part foil pouch or a dual cartridge syringe as described in U.S. Pat. No. 5,166,301 incorporated herein by reference, or available from TAH Industries Inc., Robbinsville, N.J. One part contains the thiol component with thixotrope (viscosity modifier or thickening agent) and fillers if necessary for proper mix ratio and the second part contains the other components. The two parts in the pouch can be mixed by hand after breaking the separating seal. The syringe can be fitted with a static mixing nozzle for added convenience of mixing. A pot life of up to 3–5 days is obtained in the pouch after mixing.

Actinic radiation useful in practicing the inventive methods of coating and repairing substrates include: visible light, ultraviolet light, infrared radiation, gamma radiation, X-rays, microwaves, and electron beam radiation. Suitable sources of such radiation include, but are not limited to, the sun, tungsten lamps, halogen lamps, fluorescent lamps, lasers, xenon flash lamps, carbon arcs, electron accelerators, cobalt 60, and mercury vapor discharge lamps.

Objects and advantages of this invention are further illustrated by the following examples, but the particular materials and amounts thereof recited in these examples as well as other conditions and details, should not be construed to unduly limit this invention.

| Glossary and Sources of Materials | |
|---|---|
| Polythiols | |
| PTM | pentaerythritol tetramercaptopropionate - Hampshire Chemical Corp., Lexington, MA |
| TMP | trimethylolpropane mercaptopropionate - Hampshire Chemical Corp., Lexington, MA |
| DMDO | 1,8-dimercapto-3,6-dioxooctane (also triethyleneglycol dimercaptan) Nisso Maruzen Ltd. - Tokyo, Japan |
| Vinyl ethers | |
| CHVE | 1,4-cyclohexanedimethanol divinyl ether - ISP Technologies, Inc., Wayne, NJ |
| DVE | diethyleneglycol divinyl ether - ISP Technologies, Inc., Wayne, NJ |
| TVE | trimethylolpropane trivinyl ether - ISP Technologies, Inc., Wayne, NJ |
| Acrylates | |
| Peta K | pentaerythritol triacrylate - UCB Radcure Inc., Smyrna, GA |
| TMPTA | trimethylolpropane triacrylate - UCB Radcure Inc., Smyrna, GA |
| TMPEOTA | trimethylolpropane ethoxytriacrylate - UCB Radcure Inc., Smyrna, GA |
| β-CEA | beta-carboxyethyl acrylate - UCB Radcure Inc., Smyrna, GA |
| SR9008 | trimethylolpropane poly(ethoxy)triacrylate - Sartomer Corp., Inc., Exton, PA |
| Photoinitiators | |
| LUCIRIN ™ LR8893X | 100 wt % ethyl-2,4,6-trimethyl benzyl phenyl phosphinate, (BASF Corp. Charlotte, NC) |
| IRGACURE ™ 1700 | 25 wt % bis(2,6-dimethoxybenzoyl)-2,4,4-trimethylpentyl phosphine oxide 75 wt % 2-hydroxy-2-methyl-1-phenylpropan-1-one (HMPP) (Ciba-Geigy Corp., Hawthorne, NY 10532) |
| DAROCUR ™ 4265, | 50 wt % 2,4,6-trimethyl benzoyl diphenyl phosphine oxide (TPO) 50 wt % 2-hydroxy-2-methyl-1-phenylpropan-1-one (HMPP) (Ciba-Geigy Corp., Hawthorne, NY 10532) |
| Inhibitors | |
| WAKO Q-1301 | aluminum N-nitrosophenylhydroxylamine (Wako Pure Chemical Industries, Ltd. UK) |
| Pyrogallol | 1,2,3-trihydroxybenzene (Aldrich Chemical Co., Milwaukee, WI) |
| Hydroquinone | 1,4-dihydroxybenzene (Aldrich Chemical Co., Milwaukee, WI) |
| Thixotropic Agents | |
| AEROSIL ™ R202 | hydrophobic fumed silica (Degussa Corp., Dublin, OH) |
| AEROSIL ™ R812S | hydrophobic fumed silica (Degussa Corp., Dublin, OH) |
| Surfactants | |
| FLUORAD ™ FC 430 | Fluorochemical surfactant, Minnesota Mining and Manufacturing Company (3M) Saint Paul, MN 55144 |
| Coupling Agent | |
| A 171 | Vinyltrimethoxysilane - (OSi Specialties, Danbury, CT) |
| Fillers | |
| SCOTCHLITE ™ S22 | Soda-lime-borosilicate glass bubbles (about 30 micrometers in average external diameter) having a specific gravity of 0.22 (available from 3M, Saint Paul, MN 55144). |
| R902 TiO$_2$ | Titanium dioxide (E.I DuPont de Nemours Corp., Wilmington, DE) |

Test Methods
Tensile Strength
Tensile tests were performed using the procedure described in ASTM D-412. Test specimens were cut from photocured, free-standing films using a "micro-dogbone" die. The test region of the micro-dogbone measures 3.2 millimeters×22.2 millimeters. When clamped in the Sintech "jaws", the specimen has a gauge length of 22.2 millimeters. The samples were tested at a strain rate of five (5) centimeters per minute using a Sintech 6W tensile test system (available from MTS Systems Corp., Research Triangle Park, N.C. 22709). Ultimate tensile strength at break is reported in megapascals (MPa). Percent elongation is reported in % using the crosshead movement as a measure of elongation. Modulus is reported in megapascals (MPa) and is the initial slope of the stress-strain curve.

Schiefer Abrasion Test

Putty is coated on steel plated, 10 centimeter diameter plastic discs. Adhesive backed, coated 180 or 320 grit abrasive is applied to a back up pad secured to the driven plate of a Schiefer Abrasive Tester (available from Frazier Precision Company, Gaithersburg, Md.). A piece of plain white paper is laid over the putty and marked in at least five areas where the measurements are to made. The putty thickness is measured through the paper with an Elcometer Coating thickness gauge (available from Elcometer Instruments Ltd., Manchester, England). A 4.54 kg weight is placed on the abrasion tester weight platform and the abrasive lowered onto the putty sample and the machine turned on. The machine is set for 100 or 150 cycles and automatically stops after performing the pre-set number of cycles. After each set of cycles, the putty thickness is measured and the thickness removed is recorded.

EXAMPLES

Procedure used to prepare the examples

Compounding Compositions of the Invention

The formulas for inventive compositions (expressed in weight percent of the components) are provided at the beginning of each example. The liquid components are readily miscible under moderate shear and therefore can be added in any order. However, the inventive compositions become especially light sensitive upon addition of the thiol component and thereafter must be processed and stored in the dark. Prior to addition of thiol, however, the compositions can be processed in a subdued lighting environment, which was provided in the following examples by turning off the lights in the fume hoods where the various components of compositions were mixed. The powdered components (fillers, pigments, thixotropic agents, and glass bubbles) are most easily added after the bulk of the liquid components have been blended to reduce the amount of shear required to wet and disperse the powders. A high shear, laboratory mixer was used to blend the liquid components under moderate shear and to disperse the fillers and thixotropic agents under high shear conditions. A batch size of roughly 200 grams conveniently fit into half-pint (240 milliliter) steel cans which thereafter could be stored in the dark until needed to prepare test samples. While 200 grams proved to be a convenient batch size, the compositions have been made in batches of from 100 grams to 10 kilograms.

The ethylenically unsaturated monomers, and FC-430 surfactant were generally the first components weighed into the half-pint can and stirred until a homogeneous mixture was produced. Since small quantities of inhibitors are used, their addition must be accurately controlled. The inhibitors were dissolved in a suitable solvent (to produce a 5 wt. % stock solution of inhibitor) heating the solutions when necessary to effect solution. The amounts of inhibitor used in the composition are reported in parts-per-million (ppm) instead of weight percent (wt. %). The fillers and thixotropic agents were added and mixed under high shear conditions for approximately 30 minutes until fully dispersed. When Scotchlite™ S22 glass bubbles were added they were blended into the compositions under low shear to prevent breakage.

One-part compositions containing thiol were prepared when the compositions were sprayed or spread coated immediately. Two-part compositions in which the thiol (part B) was packaged separately from the free-radically polymerizable monomers, initiators, and inhibitors (Part A) were prepared when the compositions were stored before use. Pigments, thixotropic agents, and glass bubbles can be added to either, or both, parts A and B. The two-part compositions were conveniently packaged in the 3M QL foil pack or dual-cartridge syringes so that parts A & B could be mixed immediately before use. Dual-cartridge syringes with attachable static mixing nozzles are available from TAH Industries Inc., Robbinsville, N.J.

Applying the Compositions

The inventive compositions were coated on cold-rolled steel panels (available in various sizes and thicknesses from Advanced Coating Technologies (ACT) Laboratory, Hillsdale, Mich. 49242). When adhesion to the substrates was important, the panels were sanded with 80 grit coated abrasive prior to applying the composition. When the photocured films needed to be removed for subsequent testing (Tensile tests of Example 7, for example), the steel panels were left smooth or a suitably smooth, low release surface substrate was substituted for the steel panel.

The compositions were spread coated using drawdown bars with various sized gaps appropriate for the film thicknesses desired. In some cases, the compositions were simply spread on the steel panels with a tongue depressor, and the resulting film thicknesses measured after photocure.

The compositions were also spray coated. Spray coating was conveniently accomplished by using the 3M QL two-part foil bag, which provided shelf-life, convenient mixing, and easy clean up.

Smooth, medium, and coarse textured coatings were prepared by adjusting the amount of Aerosil thixotropic agent used in the inventive composition and by adjusting the spray coating process variables (number of coats applied, distance from spray nozzle to panel, orifice diameter, and air pressure) to produce the desired texture.

Photocuring the Compositions

Coatings of the inventive compositions can be cured using any of the light sources disclosed in Example 6, Table-IV. In the examples, several of these sources were frequently used:

"Ambient fluorescent lighting" was provided by a pair of Philips TL70 fluorescent bulbs at an approximate distance of 2.5 meters.

The "spotlight" was a 500,000 candlepower spotlight available from Lectro Science, Inc. Kenilworth, Ill. Most exposures were at a distance of approximately 12 centimeters unless noted otherwise.

The "halogen work light" was a 500 watt halogen lamp of Taiwanese origin (Regent Lighting). Exposures occurred at a distance of 30 centimeters unless noted otherwise.

Painting the cured Compositions

When the compositions were evaluated as fast paint over, chip resistant coatings, the steel substrate panels were first sanded with 80 grit coated abrasive, cleaned, and painted with primer coat paint. The inventive composition was then applied as a chip-resistant coating and in most cases tested without application of color-coat and clear-coat finishes which would normally be applied during auto body repair. The examples note those cases in which the coatings of the inventive compositions were painted with the full refinish paint system. The components of auto body refinish systems and how they are used are described in *Applied Chemistry in an Invisible Car Refinish*, by F. R. J. Willemse (Progress in Organic Coatings, 17 (1989) 41–51)(Elsevier Sequoia), the disclosure of which is incorporated herein by reference. Suitable commercially available automotive refinish paint systems comprising PPG K-200 acrylic-urethane primer, DAU™ 9300 acrylic-urethane color-coat refinish paint, and Delgo DAU™ 82 clear-coat finish are produced by Pittsburgh Plate Glass, Pittsburgh, Pa. The various layers of the refinish paint system were applied with 10 minute flash time between coats using a Binks #7 spray gun in a paint booth at 345 kPa (50 pounds-force per square inch) following the manufacturer's recommended mixing instructions.

When the inventive coatings were tested as automotive putties, the examples describe how the steel panels were prepared and painted.

Example 1

This example shows some of the various types of ethylenically unsaturated monomers, polythiols, photoinitiators, inhibitors, thixotropic agents, surfactants and fillers that can be used to prepare the visible light photocurable compositions of the invention.

The ten (10) compositions (1–10) shown in Table I were prepared using the procedure described above. The compositions were spread on steel panels and cured to tack free films using the spotlight. The cured film thicknesses were in the range of approximately 350 to 650 micrometers. Entries in Table I are in weight percent except where noted.

| Peta K | 24.9 wt. % |
| Q-1301 | 400 ppm |
| CHVE | 22.7 wt. % |
| fluorochemical surfactant | 0.30 wt % |
| hydrophobic fumed silica | 4.0 wt % |
| $TiO_2$ | 3.0 wt % |
| PTM | 41.0 wt % |

Photoinitiator was added to an aliquot of stock formula A in an amount sufficient to yield a composition having the initiator concentration shown in Table II. Several milliliters of the compositions containing initiator were spread on steel panel substrates and cured to tack free films under ambient fluorescent lighting. The type and concentration of photoinitiator and resulting cure time are summarized in Table II.

TABLE II

| | Composition | | | | | |
|---|---|---|---|---|---|---|
| | 11 | 12 | 13 | 14 | 15 | 16 |
| Type of photinitiator | | | | | | |
| IRGACURE ™ 1700 | 2.00 | 4.00 | — | — | — | — |
| LUCIRIN ™ 8893 | — | — | 2.00 | 4.00 | — | — |
| DAROCURE ™ 4265 | — | — | — | — | 2.00 | 4.00 |
| Cure Time (seconds) | 240 | 420 | 1350 | 1020 | 1215 | 630 |

This example shows the range of cure times that can be obtained by varying the type and concentration of the photoinitiator.

TABLE 1

| Composition | 1 | 2 | 3 | 4 | 5 | 6 | 7 | 8 | 9 | 10 |
|---|---|---|---|---|---|---|---|---|---|---|
| Polythiols | | | | | | | | | | |
| PTM | 30.3 | 24.1 | | | 39.3 | 31.4 | 33.0 | 33.0 | 48.9 | 37.8 |
| TMP | | | 24.1 | 34.5 | | | | | | |
| DMDO | | 6.1 | 6.1 | | | | | | | |
| Vinyl ethers | | | | | | | | | | |
| CHVE | 23.1 | 23.7 | 21.1 | | 23.4 | 23.5 | 13.2 | 26.5 | 29.2 | 22.5 |
| DVE | | | | | | | 13.2 | | | |
| TVE | | | | 19.9 | | | | | | |
| Acrylates | | | | | | | | | | |
| Peta K | | | | | 21.6 | | | | | 20.7 |
| TMPTA | 31.7 | 32 | 32.0 | 32.3 | | 32.5 | 20.4 | 19.4 | | |
| TMPEOTA | | | | | | | 5.0 | 5.0 | 5.9 | 4.5 |
| Photoinitiator | | | | | | | | | | |
| IRGACURE ™ 1700 | 3.9 | 3.8 | 3.8 | 3.8 | 3.7 | 3.9 | 4.0 | 4.0 | 2.3 | 3.6 |
| Adjuvants | | | | | | | | | | |
| FLUORAD ™ FC 430 | | | | | | | 0.3 | 0.3 | | |
| Pyrogallol (ppm) | | | | | | 200 | 400 | 400 | 400 | 300 |
| Hydroquinone (ppm) | 400 | 400 | 400 | 400 | 200 | | | | | |
| AEROSIL ™ R202 | 4.8 | 4.9 | 4.9 | 4.9 | 3.5 | 4.8 | 3.8 | 3.8 | 4.3 | 3.4 |
| SCOTCHLITE ™ S22 (glass bubbles) | 3.4 | 3.5 | 3.5 | 3.5 | 4.7 | 3.4 | 7.0 | 7.0 | 5.9 | 4.5 |
| R902 $TiO_2$ | | | | | | | | | 3.4 | 2.7 |
| Cure (seconds) | 60 | 45 | 45 | 30 | 15 | 20 | 30 | 45 | 30 | 30 |

Example 2

The purpose of this example is to show how the type and concentration of the photoinitiator affects cure time.

Stock formula A containing no photoinitiator was made as follows:

Example 3

This example shows that visible light with a wavelength greater than 400 nanometers will cure the inventive compositions.

Composition 11 was spread on a steel panel. Part of the panel was covered with a 420 nanometer cutoff filter available from Esco Products Inc. and the entire panel cured to yield a tack free film using the halogen work light. The film was approximately 125 micrometers thick. A second panel was cured by exposing an identical partially filter-covered panel to ambient room fluorescent light.

|  | 500 Watt Halogen Light | | Ambient Fluorescent Light | |
|---|---|---|---|---|
|  | Filtered | Non-filtered | Filtered | Non-filtered |
| Cure time (Seconds) | 9 | 5 | 150 | 150 |

Example 4

This example shows the effectiveness of thiols in achieving rapid cure of the compositions.

Composition 11 was spread on a steel panel. An identical panel was coated with a composition similar to composition 11 but containing no thiol. The films (approximately 250 micrometers thick) were cured to a tack free state using the halogen work light. A second set of panels were cured under ambient fluorescent light.

|  | 500 Watt Halogen Light | | Ambient Fluorescent Light | |
|---|---|---|---|---|
|  | Thiol | No Thiol | Thiol | No Thiol |
| Cure time (Seconds) | 5 | 900 | 150 | 20,100 |
| Cure time (Relative) | 1 | 180 | 30 | 4,020 |

Example 5

This example shows the effectiveness of inhibitors in retarding photocure and increasing the shelf-life of the compositions.

Stock formula B was prepared as follows:

| CHVE | 24.9 wt % |
|---|---|
| Peta K | 22.7 wt % |
| PTM | 41.7 wt % |
| IRGACURE ™ 1700 | 4.0 wt % |

10 wt % solutions of inhibitors in propylene carbonate were prepared and added to stock formula B in amounts sufficient to yield inhibitor concentrations of 200, 400 and 800 ppm based on the weight of stock formula B. Cure time was determined by weighing 2 grams of each composition into foil dishes and noting the time required to cure the sample to a tack-free state under ambient fluorescent light. Storage stability was determined by noting the number of days it took for each composition to gel. The storage stability test consisted of weighing a 10 gram sample of the test composition into a glass vial which was then placed in a dark storage can maintained at room temperature. The results are shown in Table-III.

TABLE III

| Inhibitor | Composition | Inhibitor (ppm) | cure time (seconds) | Storage Stability (days) |
|---|---|---|---|---|
| Wako Q-1301 | 17 | 200 | 600 | 21 |
| Wako Q-1301 | 18 | 400 | 720 | 30 |
| Wako Q-1301 | 19 | 800 | 780 | 45 |
| pyrogallol | 20 | 200 | 2100 | 3 |
| pyrogallol | 21 | 400 | 3000 | 5 |
| pyrogallol | 22 | 800 | 5400 | 14 |

Example 6

This example shows the visible light dose required to cure compositions containing increasing amounts of photoinitiator and inhibitor.

The following two-part compositions numbered 23–34 were prepared using the procedure described above. The concentration of photoinitiator and inhibitor used in each of the test compositions is shown in Table IV:

| Part A | |
|---|---|
| CHVE | 39.5 wt % |
| Peta K | 30.5 |
| TMPEOTA | 7.6 |
| fluorochemical surfactant | 0.4 |
| hydrophobic fumed silica | 4.0 |
| glass bubbles | 12.0 |
| IRGACURE ™ 1700 | See Table IV |
| pyrogallol | See Table IV |
| Part B | |
| PTM | 86.8 wt % |
| hydrophobic fumed silica | 1.9 |
| glass bubbles | 11.3 |

TABLE IV

| Comp. # | Pyrogallol (ppm) | Irgacure ™ (wt. %) | light dose (mJoules/cm$^2$) |
|---|---|---|---|
| 23 | 100 | 3.5 | 34.2 |
| 24 | 100 | 4.0 | 25.5 |
| 25 | 100 | 4.5 | 31.2 |
| 26 | 200 | 3.5 | 42.8 |
| 27 | 200 | 4.0 | 32.8 |
| 28 | 200 | 4.5 | 28.3 |
| 29 | 200 | 5.0 | 35.1 |
| 30 | 200 | 5.5 | 32.1 |
| 31 | 200 | 6.0 | 27.7 |
| 32 | 300 | 5.0 | 35.2 |
| 33 | 300 | 5.5 | 34.4 |
| 34 | 300 | 6.0 | 36.7 |

Films were produced from the compositions by dispensing parts A & B in a volume ratio of A:B of 1.16:1.0. Several milliliters of the composition were spread on a steel panel to provide uncured film thicknesses in the range of from about 125 to about 175 micrometers (about 5 to about 7 mils) which were then cured tack free with the spotlight. Films prepared from all compositions 23–34 were cured to a tack-free state in less than 30 seconds, and the visible light dose required to effect cure is shown in Table IV. The light dose was measured using a XRD 140 A photocell attached to a IL1400A Smart Radiometer (available from International Light, Newburyport, Me.).

Compositions of the invention can be photocured with any of the light sources shown in Table V having a power output sufficient to provide a cumulative 30 second radiation dose exceeding about 20 millijoules per square centimeter at the indicated working distances from the substrate surface.

TABLE V

| Light Source | Distance (millimeters) | Dose obtained in 30 seconds (mJoules/cm$^2$) | Source |
|---|---|---|---|
| Tungsten Halogen | 125 | 93.6 | — |
| 1 Million cp Spotlight | 125 | 102.7 | A |
| 500,000 cp Spotlight | 125 | 39.8 | A |
| DUO LITE | 6 | 92.1 | B |
| MINI MAGLITE AA 1 | 12 | 65.3 | C |
| MINI MAGLITE AA 2 | 12 | 65.6 | C |
| MINI MAGLITE AA 3 | 12 | 66.7 | C |
| MINI MAGLITE AAA | 12 | 29.6 | C |
| Optronics spotlight | 12 | 52.3 | D |
| mini KRYPTON 1 | 6 | 24.9 | A |
| mini KRYPTON 2 | 12 | 18.9 | A |
| Hot Spot | 125 | 20.4 | A |

(A) Lectro Science, Inc., Kenilworth, Illinois
(B) PRI, Inc./The LITE Co., Venice, California
(C) MAG instrument, Ontario, California
(D) Optronics, Inc. Fort Gibson, Oklahoma Example 7

The purpose of this example was to determine the tensile properties of photocured films prepared from the inventive composition containing pigments.

The compositions of Table-VI were prepared using the procedure described above.

TABLE VI

| Composition | 24 | 25 | 26 | 27 |
|---|---|---|---|---|
| CHVE | 29.6 wt % | 29.6 wt % | 26.5 wt % | 26.5 wt % |
| PTM | 35.8 | 35.8 | 33.0 | 33.0 |
| PETA K | 11.5 | 0 | 16.4 | 0 |
| TMPTA | 0 | 11.5 | 0 | 16.4 |
| SR 9008 | 5.7 | 5.7 | 5.0 | 5.0 |
| β-CEA | 0 | 0 | 4.0 | 4.0 |
| IRGACURE ™ 1700 | 3.8 | 3.8 | 4.0 | 4.0 |
| fumed silica | 3.8 | 3.8 | 3.8 | 3.8 |
| glass bubbles | 9.6 | 9.6 | 7.0 | 7.0 |
| pyrogallol | 200 ppm | 200 ppm | 400 ppm | 400 ppm |

Free-standing films suitable for tensile and elongation testing were prepared by spreading several milliliters of the compositions on steel panel substrates curing to a tack free state using the spotlight. The tensile properties of the films were tested using the tensile strength test method. The results are shown in Table VII.

TABLE VII

| Composition | Film thickness (micrometers) | Tensile Strength @ Break (MPa) | Elongation % | Modulus (MPa) |
|---|---|---|---|---|
| 35 | 1000 | 2.4 | 11 | 51 |
| 35 | 1800 | 2.3 | 9 | 55 |
| 36 | 1000 | 2.9 | 14 | 36 |
| 36 | 1800 | 3.0 | 11 | 43 |
| 37 | 500 | 2.0 | 9 | 32 |
| 38 | 500 | 5.1 | 5 | 157 |

Example 8

This example provides test results for several fast paint over, chip resistant coatings prepared from the inventive compositions.

The following composition 39 was prepared using the procedure described above:

| Part A | |
|---|---|
| Peta K | 23.0 wt. % |
| CHVE | 25.2 wt. % |
| hydrophobic fumed silica | 3.0 wt % |
| TiO$_2$ | 3.0 wt % |
| IRGACURE ™ 1700 | 4.0 wt % |
| pyrogallol | 200 ppm |
| Part B | |
| PTM | 41.8 wt % |

The composition (87 grams of Part A and 63 grams of Part B) was placed in two compartments of the 3M QL foil bag described in U.S. Pat. No. 4,936,511. Just prior to use the seal between the two compartments was broken and the components were manually mixed. The samples were spray coated on steel panels that had been sanded with 80 grit coated abrasive and cleaned. The coatings were cured to a tack free state under ambient room fluorescent light to yield 50 micrometer thick films. Immediately upon reaching the tack free state, the panels were painted with acrylic-urethane refinish paint as described in the standard procedure. The following physical properties were measured after 24 hours:

| | |
|---|---|
| Cross-Cut Adhesion (ASTM D3359-B): to Substrate | 5B(100%) |
| Direct Impact (ASTM D2794-92) Resistance | 80 inch pounds-force (0.92 kilograms-force meter) |
| Reverse Impact (ASTM D2794-92) Resistance | 20 inch pounds-force (0.23 kilograms-force meter) |
| Chip Resistance (ASTM 03170-87): | 5B (Good) |
| Intercoat Adhesion (ASTM D3359-B): | 5B (100%) |

Refinish paint completely wet the photocured coating with no evidence of surface imperfections due to cratering, "fish eyes", or gloss reduction.

Composition 39 provides a sprayable fast paint over coating with sufficient thixotropic agent to provide a coating texture having a moderate orange peel.

| Composition 40 | |
|---|---|
| Part A | |
| PETA K | 23.4 wt. % |
| CHVE | 25.8 wt. % |
| fluorochemical surfactant | 0.30 wt % |
| hydrophobic fumed silica | 4.0 wt % |
| TiO$_2$ | 3.0 wt % |
| IRGACURE ™ 1700 | 2.0 wt % |
| Q-1301 | 400 ppm |
| Part B | |
| PTM | 41.5 wt % |

Panels sprayed with composition 40 from the two-part 3M QL foil bag photocured in half the time of composition 39 under ambient fluorescent lighting to yield a tack free coating that could be immediately spray painted with refinish paint. After 24 hours, the painted panels had adhesion, impact resistance, and chip resistance values approximately the same those reported above for composition 39. The reduced cure time resulted from the use of Q-1301 as the inhibitor.

Example 9

This example shows how the BYK-Gardner Wave-Scan meter can be used to quantify the textures of chip resistant, fast paint over coatings prepared from the inventive compositions.

Smooth, medium, and coarse textured spray coated steel panels were prepared by adjusting composition and spray coating process variables to produce the desired textures. A composition similar to composition 11 was sprayed on steel panels that had been sanded with 80 grit coated abrasive, cleaned, and painted with primer coat paint. The panels were cured under ambient fluorescent lighting, and the texture measured directly on the cured chip-resistant coating layer without further application of the color-coat and clear-coat refinish paint layers. A fully refinish painted control panel was prepared with omission of the inventive fast paint over chip resistant coating layer between the primer and color-coat refinish paint layers. A portion of the control was buffed with 1200 grit micro-abrasive and then polished using the PERFECT-IT™ paint finishing system available from 3M, Automotive Trades Div., Saint Paul, Minn. 55144 The texture values shown in Table VIII are the average of measurements made at several different locations on each panel using the BYK-Gardner wave scan meter (available from BYK-Gardner USA, Silver Spring, Md. 20910) using the long wavelength setting.

TABLE VIII

| Texture | BYK Wave Scan Value |
| --- | --- |
| Smooth | 60 |
| Medium | 68 |
| Course | 91 |
| Painted (Control) | 35 |
| Buffed (Control) | 4 |

These results show that it is possible to provide a quantitative estimate of the of the refinish paint texture resulting from use of the inventive compositions as chip resistant coatings.

Example 10

This example shows that glass bubble filled compositions of the invention can be used to repair small dents, paint chips, or pinholes in automotive finishes.

The following one-part, filled composition 41 having good thixotropic and anti-sag properties was prepared using the procedure described above:

| | |
| --- | --- |
| CHVE | 23.0 wt % |
| PTM | 30.0 |
| TMPTA | 31.5 |
| hydrophobic fumed silica | 5.0 |
| vinyltrimethoxysilane | 1.0 |
| hydroquinone | 2.0 |
| IRGACURE ™ 1700 | 4.0 |
| glass bubbles | 3.5 |

Steel panels were sanded with 80 grit coated abrasive and dented in several areas with a reverse impact device at 40 inch pound-force (0.46 kilogram-force meters). Composition 41 was spread over these dents and cured with the spotlight at a distance of about 20 centimeters. The repair gelled within 10 seconds and was cured to a tack free state after 60 seconds. The repair was immediately sanded using 80 grit coated abrasive. The repair exhibited excellent sandability with good feather-edge adhesion.

Example 11

This example shows that glass bubble filled compositions of the invention can be readily sanded.

The following compositions 42 and 43 were prepared using the process described above:

| Compositions | 42 | 43 |
| --- | --- | --- |
| Part A | | |
| CHVE | 41.4 wt % | 41.4 wt % |
| PETA K | 32.0 | — |
| TMPTA | — | 32.0 |
| TMPEOTA | 7.8 | 7.8 |
| hydrophobic fumed silica | 5.5 | 5.5 |
| fluorochemical surfactant | 0.5 | 0.5 |
| IRGACURE ™ 1700 | 6.2 | 6.2 |
| glass bubbles | 6.2 | 6.2 |
| pyrogallol | 400 ppm | 400 ppm |
| Part B | | |
| PTM | 81.2 | 81.2 |
| hydrophobic fumed silica | 0.8 | 0.8 |
| glass bubbles | 18.0 | 18.0 |

Part A and B were mixed at a weight ratio of 1.0 to 1.6. Sanding comparisons to commercial peroxide cured polyester putties (Comparative Compositions I & II) were conducted by applying 875 to 1250 micrometer thick coatings of the test putties to 10 centimeter metal discs used in the Schiefer test and curing following manufacturer's recommended instructions. Composition 42 was cured using the halogen work light until tack free. The Schiefer test rig was loaded with 320 grit coated abrasive and coated films tested using the method described above. The thickness of material removed per 150 revolutions was measured.

| | |
| --- | --- |
| Comparative Composition I | 265 ± 50 micrometers |
| Comparative Composition II | 175 ± 50 micrometers |
| Composition 42 | 280 ± 50 micrometers |
| Composition 43 | 290 ± 50 micrometers |

Compositions 42, 43, Comparative I, and Comparative II were coated (thickness 75 to 175 micrometers) on steel panels that had been solvent wiped and scuffed with 80 grit coated abrasive and cured tack free using the halogen work light. Adhesion of the films to steel panels was tested by bending coated panel 90 degrees 16 hours after putty was cured. The adhesion was similar for all four compositions in that only a minor amount of cracking with no peeling of the putty occurred in the vicinity of the bend.

Example 12

This example shows how a composition of the invention can be used to repair chips and scratches in clear-coat finishes.

The following composition 44 was prepared using the procedure described above:

| | |
|---|---|
| CHVE | 47.0 wt % |
| PETA K | 36.3 wt % |
| TMPEOTA | 9.1 wt % |
| fluorochemical surfactant | 0.7 wt % |
| pyrogallol | 400 ppm |
| IRGACURE ™ 1700 | 7.0 wt % |

A steel panel was painted and top coated with a clear-coat finish (PPG DELGLO™ DAU 82, available from Pittsburgh Plate Glass, Inc.). The clear-coat finish was allowed to completely dry, deliberately chipped with a screwdriver, and then scuffed with 320 grit sandpaper to simulate the typical damage that occurs in clear-coat finishes over time. One gram of composition 33 was added to 0.82 gram of PTM and thoroughly mixed. An approximately one (1) centimeter diameter spot about 100 micrometers thick was applied to chipped areas of the steel panel. The spot was cured track free in about one (1) minute using the spotlight. The repaired area was sanded smooth to the clear-coat with 320 grit sand paper thus showing that unfilled compositions of the invention can be used to repair damaged clear-coat finishes.

What is claimed is:

1. A polymerizable composition comprising:
   (a) a mixture of a vinyl monomer or oligomer and a (meth)acrylic monomer or oligomer;
   (b) at least one compound having a plurality of thiol groups; and
   (c) an acyl phosphine oxide photoinitiator blended with an α-hydroxyketone, with absorption in the visible range sufficient to initiate photopolymerization.

2. The composition of claim 1, wherein the vinyl monomer or oligomer is 1,4-cyclohexanedimethanol divinyl ether, diethylene glycol divinyl ether or a mixture thereof.

3. The composition of claim 1, wherein the acrylic monomer or oligomer is trimethylolpropane triacrylate, trimethylolpropane ethoxy triacrylate, pentaerythritol triacrylate or a mixture thereof.

4. The composition of claim 1, wherein the compound having a plurality of thiol groups is pentaerythritol tetramercaptopropionate, trimethylolpropane mercaptopropionate or a mixture thereof.

5. The composition of claim 1, wherein the photoinitiator is a compound having a formula selected from the group consisting of:

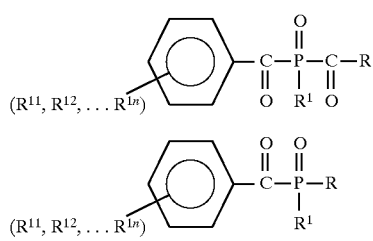

wherein
$R^{11}, R^{12}, \ldots R^{1n}$ are independently selected from the group consisting of hydrogen, alkyl of 1–4 carbon atoms, alkoxy of 1–4 carbon atoms and halogen; and n is an integer in the range of from 1 to 4,
R and $R^1$ are each independently alkyl of 1–20 carbon atoms; alkoxy of 1–6 carbon atoms; phenyl or phenyl substituted by $R^{11}, R^{12}, \ldots R^{1n}$; or R and $R^1$ when taken together with the phosphorous atom, form a 5–7 membered ring.

6. The composition of claim 5, wherein the photoinitiator is bis(2,6-dimethoxybenzoyl)-2,4,4-trimethylpentyl phosphine oxide, 2,4,6-(trimethylbenzoyl) diphenyl phosphine oxide or ethyl-2,4,6-trimethyl benzoyl phenyl phosphinate.

7. The composition of claim 1 wherein the α-hydroxyketone is a compound of the formula

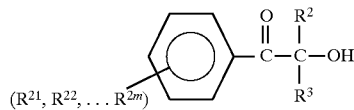

wherein $R^{21}, R^{22}, \ldots R^{2m}$, are independently selected from the group consisting of hydrogen, alkyl of 1–6 carbon atoms, alkoxy of 1–6 carbon atoms and halogen; and m is an integer in the range of from 1 to 3;
$R_2$ and $R_3$ are each independently selected from the group consisting of hydrogen, alkyl of 1–6 carbon atoms and phenyl.

8. The composition of claim 7, wherein the α-hydroxyketone is 2-hydroxy-2-methyl-1-phenylpropan-1-one.

9. The composition of claim 1, wherein components (a) and (b) are present in a molar equivalent ratio of about 1:10 to 20:1.

10. The composition of claim 1 comprising:
   (a) about 15–85 wt-% of a mixture of a vinyl monomer or oligomer and a (meth)acrylic monomer or oligomer;
   (b) about 10–90 wt-% of at least one compound having a plurality of thiol groups;
   (c) about 0.1–10.0 wt-% of an acyl phosphine oxide photoinitiator blended with an α-hydroxyketone in a weight ratio of about 95:5 to 5:95; and
   (d) about 0–20 wt-% of adjuvants.

11. The composition of claim 10, wherein adjuvants comprise a polymerization inhibitor.

12. The composition of claim 11, wherein the polymerization inhibitor is selected from the group consisting of pyrogallol, hydroquinone, butylated hydroxy toluene, and aluminum N-nitrosophenylhydroxylamine.

13. The composition of claim 11 comprising about 100 to 800 ppm of said inhibitor.

14. The composition of claim 11 adapted as a putty for the automobile industry wherein the adjuvant comprises about 2–20 wt-% of a filler.

15. The composition of claim 14, wherein the filler is glass bubbles having a particle size from about 1 to 1,000 micrometers.

16. A method of coating a substrate with a protective coating comprising:
   (a) providing a substrate having a surface that can be coated;
   (b) applying a visible light polymerizable composition to said surface wherein said composition comprises:
      (i) a mixture of a vinyl monomer or oligomer and a (meth)acrylic monomer or oligomer;
      (ii) at least one compound having a plurality of thiol groups;
      (iii) an acyl phosphine oxide photoinitiator blended with an α-hydroxyketone; and
   (c) irradiating the coated substrate with visible light until said coating is cured.

17. A method of repairing a defect in a coated substrate comprising;
  (a) providing a coated substrate having one or more defects,
  (b) applying a visible light polymerizable composition to said adherent region, wherein said composition comprises:
    (i) a mixture of a vinyl monomer or oligomer and a (meth)acrylic monomer or oligomer,
    (ii) at least one compound having a plurality of thiol groups,
    (iii) an acyl phosphine oxide photoinitiator blended with an $\alpha$-hydroxyketone, and
    (iv) at least one filler; and
  (c) irradiating the coated region with visible light until said composition is cured.

* * * * *